United States Patent [19]

Noda

[11] Patent Number: 5,448,409
[45] Date of Patent: Sep. 5, 1995

[54] GRADIENT INDEX SILICATE GLASS

[75] Inventor: Satoshi Noda, Tokyo, Japan

[73] Assignee: Olympus Optical Co., Ltd., Tokyo, Japan

[21] Appl. No.: 151,306

[22] Filed: Nov. 12, 1993

[30] Foreign Application Priority Data

Nov. 13, 1992 [JP] Japan .................................. 4-328735

[51] Int. Cl.⁶ ................................................ G02B 3/00
[52] U.S. Cl. ........................................ 359/654; 359/652
[58] Field of Search ........................ 359/652, 653, 654; 385/142, 144

[56] References Cited

U.S. PATENT DOCUMENTS 4,462,663  7/1984  Shimizu et al. ........................ 359/654

Primary Examiner—Scott J. Sugarman
Assistant Examiner—Thomas Robbins
Attorney, Agent, or Firm—Cushman Darby & Cushman

[57] ABSTRACT

A gradient index silicate glass is disclosed, which comprises a silicate glass and, incorporated therein, barium, at least one first metal selected from the group consisting of lead, titanium, niobium and tantalum and at least one second metal selected from the group consisting of potassium and sodium. The barium and the first and second metals have either protrudent and recessed concentration distribution profiles, respectively, or recessed and protrudent concentration distribution profiles, respectively. The gradient index silicate glass has a dispersion distribution of A DIRECTION permitting a highly effective optical design, and can be stably produced at low cost on a large commercial scale.

7 Claims, 2 Drawing Sheets

GRADIENT INDEX SILICATE GLASS

BACKGROUND OF THE INVENTION

1. Field of the Invention

The present invention relates to a gradient index silicate glass, especially one readily produced by the sol-gel process.

2. Discussion of Related Art

The lens known as GRIN lens (gradient index lens) is a novel lens which has a refractive index distribution in its medium, so that not only refraction on lens surface but also refraction in the medium of the lens can be utilized. Especially, the radially gradient index optical element having a refractive index distribution along the radial direction thereof permits correction of curvature of field and aberration, including chromatic aberration, which has been impossible for nonspherical lenses. In particular, the correction of chromatic aberration is extremely advantageous for lens systems used under white light, such as a camera and a microscope. The correction of chromatic aberration largely depends on the characteristics (dispersion distribution) of the medium of the GRIN lens, and hence not all GRIN lenses have desirable ability to correct chromatic aberration.

The dispersion distribution is classified into two major categories on the basis of the direction of line corresponding to the characteristics of the gradient index optical element, as drawn on the $n_d$ (refractive index)$-\nu_d$ (Abbe's number) diagram of the appended drawing. In this connection, reference is made to U.S. Pat. No. 5,171,344. One of the two major categories is "high distributed dispersion" or "dispersion of B DIRECTION (indicated on the $n_d-\nu_d$ diagram)" as exhibited by SELFOC (registered trademark) lens. The other is "dispersion of A DIRECTION (indicated on the $n_d-\nu_d$ diagram)" which includes "negative distributed dispersion" along the direction perpendicular to the B DIRECTION and "low distributed dispersion" along nearly vertical directions close to the B DIRECTION.

In the dispersion distribution of the B DIRECTION, an intense chromatic aberration occurs in the same direction as that brought about by surface refraction. On the other hand, in the dispersion distribution of the A DIRECTION, a chromatic aberration occurs either significantly weakly in the same direction or in the reverse direction. In order to make an optical design fully utilizing the characteristics of a gradient index optical element, it is advantageous to employ an optical element having the characteristics of the A DIRECTION, i. e. , conducting chromatic aberration behavior which is different from that of surface-occurring chromatic aberration.

The glass composition for realizing a gradient index optical element having the above characteristics and a large refractive index gradient Δn is disclosed in U.S. Pat. No. 5,166,827. The process for producing the gradient index optical element having the above characteristics is disclosed in U.S. Pat. No. 5,171,344. In the gradient index optical element disclosed therein, two types of metals are incorporated in predetermined proportions, and have concentrations distributed in mutually reverse directions.

The glass composition disclosed in U.S. Pat. No. 5,166,827 is excellent from the viewpoint that desired optical characteristics are attained. However, the composition does not always ensure stable production, and, especially, stable, low-cost production on a large commercial scale is difficult. For example, when La or Y being a rare earth element is used, vitrification in a silicate glass system is difficult, so that small articles for tests would be producible but production of large-aperture articles would be extremely difficult. Further, it is likely for the glass to have a thermal expansion coefficient distribution along the radial direction, by which the glass may have different shrinkage ratios at the time of cooling subsequent to firing in the finishing step of the sol-gel process, so that tensile stress occurs in the surface portion of the glass to cause breakage thereof.

SUMMARY OF THE INVENTION

The present invention has been made with a view toward obviating the above drawback of the prior art.

It is, therefore, an object of the present invention to provide a glass composition suitable for stably producing a gradient index silicate glass having a dispersion distribution of the A DIRECTION, so that highly effective optical design is ensured, at low cost on a large commercial scale.

The foregoing and other objects, features and advantages of the present invention will become apparent from the following detailed description and appended claims taken in connection with the accompanying drawings.

DETAILED DESCRIPTION OF THE INVENTION

In order to attain the above object, according to the present invention, there is provided a gradient index silicate glass comprising a silicate glass and, incorporated therein, barium, at least one first metal selected from the group consisting of lead, titanium, niobium and tantalum and at least one second metal selected from the group consisting of potassium and sodium, wherein said barium and said first and second metals have either protrudent and recessed concentration distribution profiles, respectively, or recessed and protrudent concentration distribution profiles, respectively.

In the present invention, further, at least one dopant selected from the group consisting of aluminum, boron and zirconium may be added to the gradient index silicate glass.

How the present invention has been made will now be briefly described. The inventor has made extensive and intensive studies to resolve the above drawback of the prior art. As a result, it has been found that, if barium is incorporated as an element capable of providing a refractive index distribution in a silicate glass, the barium content of the glass can be large so as to enable the value of $\Delta n$ to be large and other components can be incorporated with greater freedom so as to markedly increase composition varieties. Therefore, the inventor has found that barium is the most suitable main element for providing a refractive index distribution, and that it is essential to incorporate barium with a concentration distribution in order to obtain a silicate glass composition suitable for stable production of a gradient index optical element having a dispersion distribution of the A DIRECTION and exhibiting a large value of $\Delta n$.

Figure 1:
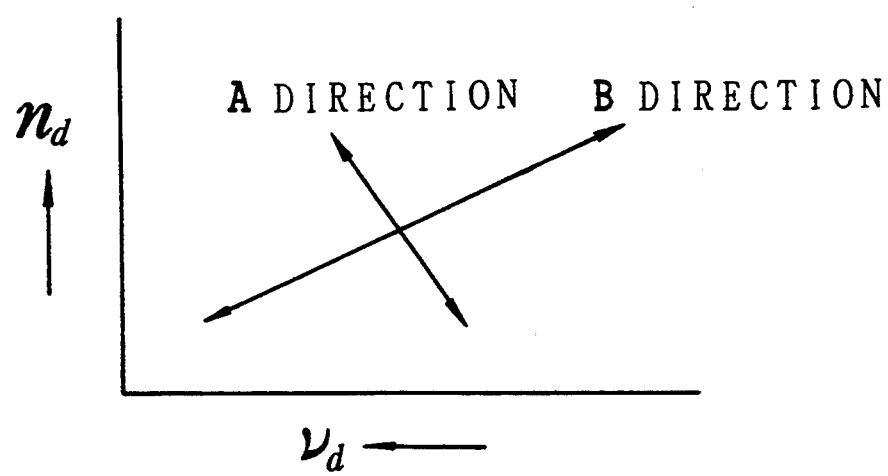
FIG. 1 is a diagram showing the relationship between the refractive index and the Abbe's number for gradient index optical elements.
Figure 2:
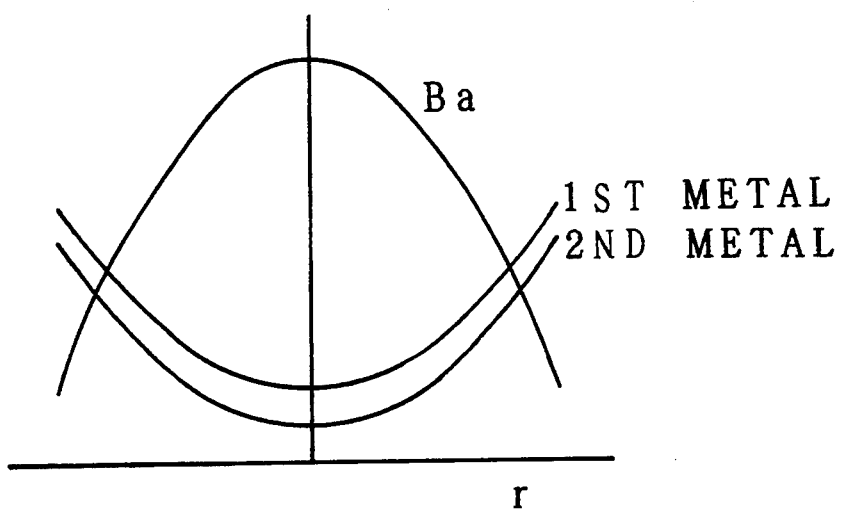
FIG. 2 shows parallel coordinates in which, with respect to a gradient index silicate glass comprising a glass medium having a positive power according to the present invention, an example of protrudent, especially convex, concentration distribution profile is illustrated for Ba, while examples of recessed, especially concave, concentration distribution profiles are illustrated for first and second metals, the magnitude relationship between the concentrations thereof being reversible.
Figure 3:
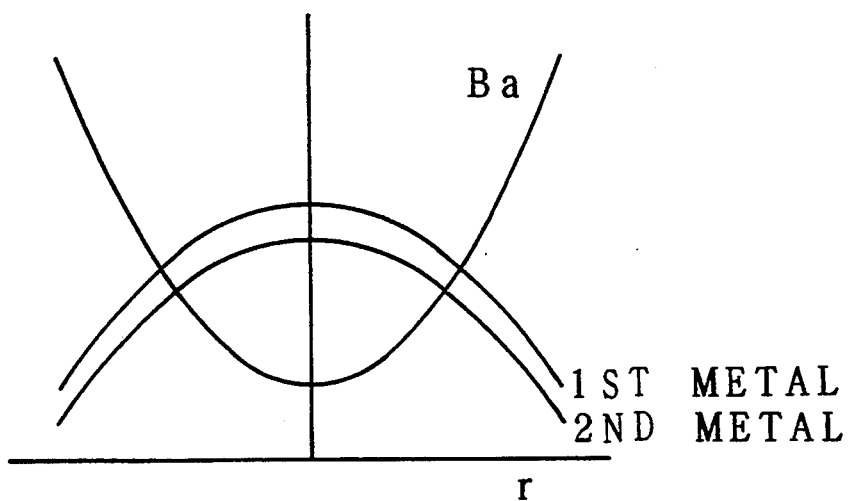
FIG. 3 shows parallel coordinates in which, with respect to a gradient index silicate glass comprising a glass medium having a negative power according to the present invention, an example of recessed, especially concave, concentration distribution profile is illustrated for Ba, while examples of protrudent, especially convex, concentration distribution profiles are illustrated for first and second metals, the magnitude relationship between the concentrations thereof being reversible, in the parallel coordinates of FIGS. 2 and 3, the origin indicates the center of the glass, agreeing with the optical axis, the axis of abscissa indicates the distance from the center along the radial direction, and the axis of ordinate indicates the concentration of each metal.

Further, it has been found that, if at least one metal (first metal) selected from the group consisting of lead, titanium, niobium and tantalum is employed as a component for regulating the dispersion distribution and is incorporated with a concentration distribution reverse to that of barium, the dispersion distribution of the silicate glass can be regulated to become that of the A DIRECTION without causing the glass to lose transparency. The selection of these elements is advantageous in that markedly high dispersion is exhibited in the silicate glass, and that the combination with barium readily provides a dispersion distribution of the A DIRECTION exhibiting a large value of $\Delta n$. Further, the above selection is advantageous in that titanium, niobium and tantalum in the form of metal alkoxides are liquid at room temperature so that their incorporation into a gel is easy in the optical element production according to the sol-gel process, and that lead can be introduced into the gel in the form of an acetate salt or the like. With respect to the concentration distribution of barium, it may be either protrudent, e.g., convex, as shown in FIG. 2, in the sense that the concentration is high at the center but low at the periphery, or recessed, e.g., concave, as shown in FIG. 3, in the sense that the concentration is low at the center but high at the periphery of the optical element. When the concentration distribution of barium is protrudent, that of the first metal is of course recessed as also shown in FIG. 2. On the other hand, when the concentration distribution of barium is recessed, that of the first metal is of course protrudent as also shown in FIG. 3.

The dispersion distribution of the optical element can satisfactorily be controlled by the above combination of at least one metal selected from the group consisting of lead, titanium, niobium and tantalum with barium. However, in almost all cases, a distribution of thermal expansion coefficient remains along the radial direction of the optical element. The inventor has found that the thermal expansion coefficient gradient caused by the concentration distribution of barium can be countered by incorporating at least one metal (second metal) selected from the group consisting of potassium and sodium in a manner such that the barium and the above metal have either protrudent and recessed concentration distribution profiles, respectively, or recessed and protrudent concentration distribution profiles, respectively. The incorporation of sodium and potassium is advantageous in that these have little effect on the refractive index and dispersion distribution of the optical element and are suitable components capable of further facilitating vitrification.

When the concentration distribution of barium is protrudent, that of the second metal is of course recessed as also shown in FIG. 2. On the other hand, when the concentration distribution of barium is recessed, that of the second metal is of course protrudent as also shown in FIG. 3. In FIGS. 2 and 3, the concentration of the first metal is greater than that of the second metal. However, this magnitude relationship can be reversed.

When the value of $\Delta n$ is extremely large, e.g., 0.1 or more, the barium content and the content of sodium and potassium added to counter the thermal expansion coefficient gradient caused by the concentration distribution of barium are likely to be so large that a decrease in the chemical durability of the optical element surfaces as a new problem. It has been found that this problem can be coped with by the addition of at least one dopant selected from the group consisting of aluminum, boron and zirconium. Of these, aluminum and boron are preferred because their effect on the refractive index and dispersion distributions of the optical element is less.

In the gradient index silicate glass of the present invention, it is preferred that the barium has a concentration ranging from 0 to 40 mol % in terms of oxide.

Further, in the gradient index silicate glass of the present invention, it is preferred that the first and second metals have concentrations ranging from 0 to 20 mol % in terms of oxide and from 0 to 40 mol % in terms of oxide, respectively.

Still further, in the gradient index silicate glass of the present invention, it is preferred that the aluminum, boron and zirconium have concentrations ranging from 0 to 40, from 0 to 40 and from 0 to 20 mol %, respectively.

As described above, the glass composition according to the present invention is suitable for stably producing a gradient index silicate glass having a dispersion distribution of the A DIRECTION, so that highly effective optical design is ensured, at low cost on a large commercial scale.

PREFERRED EMBODIMENT OF THE INVENTION

EXAMPLE 1

7.5 ml of tetramethyl silicate (TMOS) and 7.5 ml of tetraethyl silicate (TEOS) were mixed together, and 5 ml of 0.01N hydrochloric acid was added. The mixture was agitated for 1 hr to partially hydrolyze the silicon alkoxides. Added to the resultant mixture was a mixture of 13 ml of a 1.35 mol/l aqueous solution of barium acetate and 3.8 ml of acetic acid. The mixture was agitated to obtain a sol, and the sol was poured into a container of polypropylene (hereinafter referred to as "PP"). The container was placed in a thermostatic bath set at 30° C. to gel the sol.

The gel was matured in the thermostatic bath set at 30° C. for one week. The gel was successively immersed in methanol, a 1:1 mixture of methanol and ethanol, ethanol and acetone for two days each to effect solvent replacements in the gel so that microcrystals of barium acetate were formed and immobilized in the inner wall of the pores of the gel.

Subsequently, the gel was immersed in a saturated methanol solution of potassium acetate for 8 hr to exchange the barium present in the gel with the potassium present in the solution. Then, the gel was immersed in ethanol to form microcrystals of barium acetate in the inner wall of the pores of the gel, so that a protrudent concentration distribution profile of barium was immobilized. With respect to potassium acetate, it was presumed that precipitation and immobilization would not occur in ethanol, and that one having a recessed concentration distribution profile would be re-diffused to have a flat concentration distribution profile.

The gel was further immersed in a saturated ethanol solution of lead acetate for 7 hr to exchange the potassium present in the gel with the leads-present in the solution. Then, the gel was successively immersed in a 1:1 mixture of isopropanol (hereinafter referred to as "IPA") and acetone, a 1:4 mixture of IPA and acetone, and acetone, so that the concentration distribution profiles of lead and potassium acetates were immobilized. In the IPA, it was presumed that lead acetate would precipitate to only immobilize a protrudent concentration distribution profile while the concentration distribution profile of potassium acetate would be flattened.

Still further, the gel was immersed in a saturated potassium acetate solution in a 3:1 mixture of IPA and ethanol for 4 hr to provide the potassium with a recessed concentration distribution profile. Then, the gel was successively immersed in a 1:1 mixture of IPA and acetone, a 1:4 mixture of IPA and acetone, and acetone, to immobilize the concentration distribution profiles.

After completion of the immobilization of the concentration distribution profiles, the gel was returned into the PP container. The container was sealed with an aluminum foil, in which pin holes were made. The container was put in a thermostatic bath set at 30° C. for one week to dry the gel. Thus, a translucent xerogel was obtained.

The thus obtained xerogel was fired at temperatures elevated to 590° C., thereby forming an optical glass element of gradient index silicate glass having a diameter of about 12 mm.

The resultant glass element had a protrudent concentration distribution profile of barium and recessed concentration distribution profiles of lead and potassium, in which the concentration of lead was nearly zero around the center.

Measurement of critical angle changes along the radial direction of the optical element at different wavelengths showed that the gradient index optical element had excellent chromatic dispersion characteristics such that a high refractive index and a low dispersion were exhibited at the center while a low refractive index and a high dispersion were exhibited at the periphery.

EXAMPLE 2

10 ml of methanol was added to 10.4 ml of tetramethyl silicate (TMOS), and agitated until a homogeneous mixture was obtained. 5.2 ml of 1/100N hydrochloric acid was added to conduct a partial hydrolysis accompanied by heat generation. After the heat generation was stopped, 100 ml of a 0.3 mol/l aqueous solution of barium nitrate was added, agitated, and put in a PP test tube having a diameter of 35 mm. The test tube was allowed to stand still at room temperature to obtain a milky transparent gel. This gel was matured in a thermostatic bath set at 30° C. for one week.

After the maturation, the gel was successively immersed in methanol, a 1:1 mixture of methanol and ethanol, ethanol and acetone for two days each, so that microcrystals of barium nitrate were formed and immobilized in the skeleton of the gel. Then, the gel was immersed in an ethanol solution containing 0.6 mol/l potassium nitrate and 0.3 mol/l lead nitrate for 8 hr to form concentration distributions. The resultant gel was successively immersed in IPA, a 1:1 mixture of IPA and acetone, and acetone for two days each to obtain three immobilized concentration distribution profiles.

The gel was dried in the thermostatic bath set at 30° C., and fired to thereby obtain an optical glass element of transparent gradient index silicate glass having a diameter of 12 mm, which was free of surface cracks.

Measurement of critical angle changes along the radial direction of the optical element at different wavelengths showed that the gradient index optical element had excellent chromatic dispersion characteristics such that a high refractive index and a low dispersion were exhibited at the center while a low refractive index and a high dispersion were exhibited at the periphery.

EXAMPLE 3

An optical element of gradient index silicate glass comprising $SiO_2$, $BaO$, $PbO$ and $K_2O$ in respective molar proportions of 70, 30, 4 and 5 at the center, and 70, 10, 8 and 11 at the periphery, thus causing the barium to have a protrudent concentration distribution profile and the lead and potassium to have recessed concentration distribution profiles, was produced in the same manner as in Example 1. The resultant optical element was free of cracks and exhibited excellent chromatic dispersion characteristics.

EXAMPLE 4

An optical element of gradient index silicate glass comprising $SiO_2$, $BaO$, $TiO_2$ and $K_2O$ in respective molar proportions of 70, 20, 6 and 2 at the center, and 70, 5, 6 and 8 at the periphery, thus causing the barium to have a protrudent concentration distribution profile and the potassium to have a recessed concentration distribution profile, in which the titanium had a recessed concentration distribution profile while keeping constant the molar proportion to the silicon as the skeleton of the glass, was produced in the same manner as in Example 1. The resultant optical element was free of cracks and exhibited excellent chromatic dispersion characteristics.

EXAMPLE 5

An optical element of gradient index silicate glass comprising $SiO_2$, $BaO$, $Nb_2O_5$, $Na_2O$ and $Al_2O_3$ in respective molar proportions of 70, 25, 5, 3 and 5 at the center, and 70, 5, 5, 6 and 5 at the periphery, thus causing the barium to have a protrudent concentration distribution profile and the sodium to have a recessed concentration distribution profile, in which the niobium and aluminum had recessed concentration distribution profiles while keeping nearly constant their molar proportions to the silicon as the skeleton of the glass, was produced in the same manner as in Example 1. The resultant optical element was free of cracks and exhibited excellent chemical durability and chromatic dispersion characteristics.

What is claimed is:

1. A gradient index silicate glass comprising a silicate glass and, incorporated therein, barium, at least one first metal selected from the group consisting of lead, titanium, niobium and tantalum and at least one second metal selected from the group consisting of potassium and sodium, wherein said barium has protrudent concentration distribution profile while said first and said second metals have recessed concentration distribution profiles, or wherein said barium has recessed concentration distribution profile while said first said second metals have protrudent concentration distribution profiles.

2. The gradient index silicate glass according to claim 1, wherein said barium has a concentration ranging from 0 to 40 mol % in terms of oxide.

3. The gradient index silicate glass according to claim 1, wherein said first metal has a concentration ranging from 0 to 20 mol % in terms of oxide.

4. The gradient index silicate glass according to claim 1, wherein said second metal has a concentration ranging from 0 to 40 mol % in terms of oxide.

5. The gradient index silicate glass according to claim 1, wherein said barium has convex concentration distribution profile while said first and said second metals have concave concentration distribution profiles, or wherein said barium has concave concentration distribution profile while said first and said second metals have convex concentration distribution profiles.

6. A gradient index silicate glass comprising a silicate glass and, incorporated therein, barium, at least one first metal selected from the group consisting of lead, titanium, niobium and tantalum, at least one second metal selected from the group consisting of potassium and sodium, and at least one dopant selected from the group consisting of aluminum, boron and zirconium, wherein said barium has protrudent concentration distribution profile while said first and said second metals have recessed concentration distribution profiles, or wherein said barium has recessed concentration distribution profile while said first and said second metals have protrudent concentration distribution profiles.

7. The gradient index silicate glass according to claim 6, wherein said aluminum, boron and zirconium have concentrations ranging from 0 to 40, from 0 to 40 and from 0 to 20 mol %, respectively.

* * * * *